United States Patent
Wang et al.

(10) Patent No.: US 12,192,087 B2
(45) Date of Patent: Jan. 7, 2025

(54) NETWORK DISTRIBUTION METHOD AND SYSTEM

(71) Applicant: HUAWEI TECHNOLOGIES CO., LTD., Guangdong (CN)

(72) Inventors: Jian Wang, Wuhan (CN); Yuhua Shu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/156,914

(22) Filed: Jan. 19, 2023

(65) Prior Publication Data

US 2023/0155914 A1    May 18, 2023

Related U.S. Application Data

(63) Continuation of application No. PCT/CN2021/108191, filed on Jul. 23, 2021.

(30) Foreign Application Priority Data

Jul. 31, 2020   (CN) .......................... 202010763265.2

(51) Int. Cl.
*H04L 43/12*    (2022.01)
*H04W 12/037*   (2021.01)
*H04W 76/10*    (2018.01)

(52) U.S. Cl.
CPC ........... *H04L 43/12* (2013.01); *H04W 12/037* (2021.01); *H04W 76/10* (2018.02)

(58) Field of Classification Search
None
See application file for complete search history.

(56) References Cited

U.S. PATENT DOCUMENTS

| 10,419,908 | B1  |   | 9/2019 | Hutz et al. |
| 11,284,258 | B1  | * | 3/2022 | Wei ......................... H04L 63/10 |
| 2006/0023651 | A1 |  | 2/2006 | Tsuchiuchi et al. |
| 2006/0153156 | A1 |  | 7/2006 | Wentink et al. |

(Continued)

FOREIGN PATENT DOCUMENTS

| CN | 102457850 A | 5/2012 |
| CN | 103987073 A | 8/2014 |

(Continued)

OTHER PUBLICATIONS

Gridelli, "How WiFi Conenction Works" (Year: 2019).*

*Primary Examiner* — Shirley X Zhang

(57) ABSTRACT

This application relates to the field of communications technologies, and discloses a network distribution method and system. A first electronic device sends a first probe request, and a second electronic device sends a first probe response after receiving the first probe request. The first electronic device establishes a first connection to the second device by using temporary networking data in the first probe response. The second electronic device transmits network distribution data of a master access point to the first electronic device through a temporary network of the first connection. The first electronic device and the second device then establishes a second connection through the temporary network in an encrypted manner. Therefore, network security of the first electronic device and the second electronic device is high.

17 Claims, 4 Drawing Sheets

(56) References Cited

U.S. PATENT DOCUMENTS

| | | |
|---|---|---|
| 2016/0007275 A1 | 1/2016 | Park et al. |
| 2016/0212693 A1 | 7/2016 | Lee et al. |
| 2017/0041977 A1 | 2/2017 | Yokoyama et al. |
| 2018/0248697 A1 | 8/2018 | Shimada et al. |
| 2020/0151976 A1 | 5/2020 | Keohane et al. |

FOREIGN PATENT DOCUMENTS

| | | | | |
|---|---|---|---|---|
| CN | 104506397 A | * | 4/2015 | |
| CN | 105099837 A | | 11/2015 | |
| CN | 105119939 A | | 12/2015 | |
| CN | 108063704 A | | 5/2018 | |
| CN | 207766561 U | | 8/2018 | |
| CN | 109963352 A | | 7/2019 | |
| CN | 110809308 A | | 2/2020 | |
| CN | 110855677 A | | 2/2020 | |
| CN | 110995665 A | | 4/2020 | |
| CN | 111083765 A | | 4/2020 | |
| CN | 113873505 A | * | 12/2021 | |
| WO | WO-2018107671 A1 | * | 6/2018 | ............. H04L 63/06 |

\* cited by examiner

NETWORK DISTRIBUTION METHOD AND SYSTEM

CROSS-REFERENCE TO RELATED APPLICATIONS

This application is a continuation of International Application No. PCT/CN2021/108191, filed on Jul. 23, 2021, which claims priority to Chinese Patent Application No. 202010763265.2, filed on Jul. 31, 2020. The disclosures of the aforementioned applications are hereby incorporated by reference in their entireties.

TECHNICAL FIELD

This application relates to the field of communication technologies, and in particular, to a network distribution method and system.

BACKGROUND

A smart household connects various devices (such as an audio and video device, a lighting system, curtain control, air conditioning control, a security system, a digital cinema system, and an Internet appliance) in a home by using an Internet of Things technology, and provides various functions and means such as home appliance control, lighting control, curtain control, telephone remote control, indoor and outdoor remote control, anti-theft alarm, environment monitoring, heating, ventilation, and air conditioning control, infrared forwarding, and programmable timing control. Mainstream manners in which the smart household is connected to a network connection center are Bluetooth communication, wireless-fidelity (Wireless-Fidelity, Wi-Fi) communication, ZigBee (zigbee) protocol communication, and the like.

Currently, a network distribution manner between the smart household and the network connection center is mainly wireless soft-access point (Soft-Access Point, SOFT AP) network distribution. When network distribution is performed on a to-be-networked smart household in a SOFT AP manner, an application (APP) needs to be installed in a mobile phone or computer, to implement network distribution between the to-be-networked smart household and a router by using the APP in the mobile phone or computer. When network distribution is performed in the SOFT AP manner, network distribution between the to-be-networked smart household and the router is completed in the SOFT AP manner with the help of the third-party mobile phone or computer, and network distribution between the to-be-networked smart household and the router is not directly performed. In this case, a network distribution operation is tedious. In addition, when network distribution is performed on the to-be-networked smart household by using the mobile phone or computer, a network that the mobile phone or the computer currently access needs to be switched to a network broadcast by the to-be-networked smart household. Because some mobile phones or computers have a compatibility problem, network distribution is prone to failing. Consequently, accessibility of this network distribution manner is poor.

SUMMARY

An objective of the present disclosure is to provide a network distribution method and system, to resolve a compatibility problem between a mobile phone and a computer, and improve a success rate of network distribution with good accessibility.

According to a first aspect, this application discloses a network distribution method, applied to a first electronic device. The network distribution method includes:
  sending a first probe request, where the first probe request carries device information of the first electronic device, and specifically, the first electronic device may be a smart camera, a smart television, or the like;
  receiving a first probe response sent by a second electronic device, where the first probe response is sent after the second electronic device receives the first probe request, and the first probe response carries temporary networking data, the second electronic device may be a router (for example, a HiLink router) or another electronic device that has a routing function (for example, a computer, a mobile phone, or a smart household that has a routing function), and the temporary networking data includes but is not limited to a first Service Set Identifier (SSID) and a specified channel that are transmitted by the second electronic device for the first electronic device;
  establishing a first connection to the second electronic device by using the temporary networking data, where the first electronic device provides a temporary network for the second electronic device by using the temporary networking data, so that the second electronic device transmits network distribution data of a master access point of the second electronic device to the first electronic device by using the temporary network;
  receiving the network distribution data of the master access point of the second electronic device from the second electronic device, where the network distribution data of the master access point includes a second SSID and a password of the master access point; and
  accessing the master access point of the second electronic device by using the network distribution data of the master access point, and establishing a second connection to the second electronic device.

In the network distribution method disclosed in the first aspect of this application, the first electronic device sends the first probe request, and the second electronic device sends the first probe response after receiving the first probe request. The first electronic device establishes the first connection by using the temporary networking data in the first probe response. The second electronic device transmits the network distribution data of the master access point to the first electronic device through the temporary network of the first connection. The first electronic device establishes the second connection to the second electronic device by using the SSID and the password of the master access point in the network distribution data. The second electronic device establishes the first connection by using the temporary networking data, and feeds back the SSID and the password of the master access point to the first electronic device by using the temporary network established through the first connection. Therefore, network security of the first electronic device and the second electronic device is high.

In an embodiment disclosed in the first aspect of this application, that the first probe request carries device information of the first electronic device is specifically: an extended field of the first probe request carries the device information of the first electronic device.

That the first probe response carries temporary networking data is specifically: an extended field of the first probe response carries the temporary networking data.

In an embodiment disclosed in the first aspect of this application, the temporary networking data includes a first SSID and a specified channel that are temporarily allocated by the second electronic device, and the first SSID is used for communication between the first electronic device and the second electronic device through the specified channel.

In an embodiment disclosed in the first aspect of this application, the receiving the network distribution data of the master access point of the second electronic device from the second electronic device specifically includes:

receiving, through the specified channel in the temporary networking data, the network distribution data of the master access point of the second electronic device from the second electronic device.

In this embodiment of this application, the second electronic device transmits the network distribution data of the master access point to the first electronic device by using the first SSID and the specified channel in this application, that is, the second electronic device feeds back the SSID and the password of the master access point to the first electronic device through the first connection established between the first electronic device and the second electronic device. Therefore, network security of the first electronic device and the second electronic device is high.

In an embodiment disclosed in the first aspect of this application, the network distribution data of the master access point includes an encrypted second SSID of the master access point of the second electronic device and an encrypted password for accessing the second SSID.

In an embodiment disclosed in the first aspect of this application, before the sending a first probe request, the network distribution method disclosed in this embodiment of this application further includes:

sending a second probe request, where the second probe request carries at least the device information of the first electronic device; and receiving a second probe response fed back by the second electronic device for the second probe request, where the second probe response is used to indicate the first electronic device to perform network distribution with the second electronic device.

In an embodiment disclosed in the first aspect of this application, the first probe request and the second probe request may be the same. Certainly, the first probe request and the second probe request may alternatively be different. For example, the first probe request may carry a device ID and a device type; and the second probe request may carry a device ID, a device type, and a device model. This is not limited in this embodiment of this application.

In an embodiment disclosed in the first aspect of this application, before the receiving the network distribution data of the master access point of the second electronic device from the second electronic device, the method further includes:

performing IP layer negotiation with the second electronic device, so that the second electronic device generates, in an encrypted manner, the second SSID of the master access point of the second electronic device and the password for accessing the second SSID.

In an embodiment disclosed in the first aspect of this application, after the second connection is established to the second electronic device based on the network distribution data, the first connection between the first electronic device and the second electronic device is disconnected.

In an embodiment disclosed in the first aspect of this application, the device information of the first electronic device includes at least one of a device ID, a device type, a model, a version, a manufacturer, or a device name of the first electronic device.

In an embodiment disclosed in the first aspect of this application, the first electronic device sends the first probe request in an AP mode.

In an embodiment disclosed in the first aspect of this application, the first probe request is periodically sent, or the first probe request is broadcast on a full-channel full-time basis.

In an embodiment disclosed in the first aspect of this application, after receiving the first probe response sent by the second electronic device, the first electronic device enters a STA mode.

According to a second aspect, this application discloses a network distribution method, applied to a second electronic device, and including:

receiving a first probe request sent by a first electronic device, where the first probe request carries device information of the first electronic device;

sending a first probe response to the first electronic device, where the first probe response carries temporary networking data;

establishing a first connection to the first electronic device;

sending network distribution data of a master access point of the second electronic device to the first electronic device; and establishing a second connection to the second electronic device.

In an embodiment disclosed in the second aspect of this application, that the first probe request carries device information of the first electronic device is specifically: an extended field of the first probe request carries the device information of the first electronic device.

That the first probe response carries temporary networking data is specifically: an extended field of the first probe response carries the temporary networking data.

In an embodiment disclosed in the second aspect of this application, the temporary networking data includes a first SSID and a specified channel that are temporarily allocated by the second electronic device, and the first SSID is used for communication between the first electronic device and the second electronic device through the specified channel.

In this embodiment of this application, the second electronic device transmits the network distribution data of the master access point to the first electronic device by using the first SSID and the specified channel in this application, that is, the second electronic device feeds back the SSID and the password of the master access point to the first electronic device through the first connection established between the first electronic device and the second electronic device. Therefore, network security of the first electronic device and the second electronic device is high.

In an embodiment disclosed in the second aspect of this application, the network distribution data of the master access point includes an encrypted second SSID of the master access point of the second electronic device and an encrypted password for accessing the second SSID.

In an embodiment disclosed in the second aspect of this application, before the receiving a first probe request sent by a first electronic device, the method further includes:

receiving a second probe request sent by the first electronic device, where the second probe request carries at least the device information of the first electronic device; and sending a second probe response to the first electronic device, where the second probe response is used to indicate the first electronic device to perform network distribution with the second electronic device.

In an embodiment disclosed in the second aspect of this application, the second electronic device includes a first control.

Before the receiving a first probe request sent by a first electronic device, the method further includes:
receiving an operation performed by a user to trigger the first control.

Before the sending network distribution data of a master access point of the second electronic device to the first electronic device, the network distribution method further includes:
performing IP layer negotiation with the first electronic device, and encrypting the network distribution data of the master access point of the second electronic device, to generate the second SSID of the master access point of the second electronic device and the password for accessing the second SSID.

In an embodiment disclosed in the second aspect of this application, after the second connection is established to the first electronic device, the first connection to the first electronic device is disconnected.

In an embodiment disclosed in the second aspect of this application, the device information of the first electronic device includes at least one of a device ID, a device type, a model, a version, a manufacturer, or a device name of the first electronic device.

In an embodiment disclosed in the second aspect of this application, the second electronic device is specifically a HiLink router, and the first control is a Hi button.

According to a third aspect, this application discloses a network distribution system, including: a first electronic device and a second electronic device.

The first electronic device sends a first probe request, where the first probe request carries device information of the first electronic device.

The second electronic device sends a first probe response, where the first probe response is sent after the second electronic device receives the first probe request, and the first probe response carries temporary networking data.

The first electronic device receives the first probe response.

The first electronic device establishes a first connection to the second electronic device by using the temporary networking data.

The second electronic device sends network distribution data of a master access point of the second electronic device.

The first electronic device receives the network distribution data, and accesses the master access point of the second electronic device by using the network distribution data, to establish a second connection to the second electronic device.

In an embodiment disclosed in the third aspect of this application, the first electronic device is specifically a smart camera, the second electronic device is specifically a HiLink router, and the HiLink router includes a Hi button.

The smart camera continuously broadcasts, in an AP mode in a full-channel full-time broadcast manner, a second Probe Request that carries an extended field 1 (Information Element 1, IE 1).

After receiving the second Probe Request, the HiLink router sends a second probe response Probe Response to the smart camera for the second Probe Request, where the second probe response Probe Response is used to notify the smart camera that the HiLink router receives the second Probe Request and agrees that the smart camera performs network distribution.

The HiLink router receives an operation performed by a user to trigger the Hi button.

The smart camera still continuously broadcasts, in the AP mode in the full-channel full-time broadcast manner, the first probe request that carries the extended IE 1, where the first Probe Request carries the device information of the smart camera, and the device information of the smart camera includes at least one of a device ID, a device type, a model, a version, a manufacturer, or a device name of the smart camera.

The HiLink router sends, to the smart camera for the first Probe Request, the first probe response Probe Response that carries an extended field 2 (Information Element 2, IE 2), where the extended field 2 includes a temporary SSID and a specified channel.

After receiving the first probe response Probe Response that carries the extended IE 2, the smart camera switches from the AP mode to a STA mode.

The smart camera establishes a temporary network by using the temporary SSID carried in the first probe response Probe Response.

The HiLink router performs IP layer security negotiation with the smart camera based on a personal identification number and a password-based exponential key exchange protocol, and encrypts an SSID and a password of the master access point.

The HiLink router transmits the SSID and the password of the master access point to the smart camera by using the temporary SSID and the specified channel in an encrypted manner.

The smart camera receives and decrypts the SSID and the password of the master access point, and is connected to the master AP of the HiLink router by using the SSID and the password that are of the master access point and that are obtained through decryption, to complete network distribution.

The HiLink router disables the temporary SSID.

Other features and corresponding beneficial effects of the present disclosure are described later in this specification. In addition, it should be understood that at least some of the beneficial effects become apparent from the descriptions in this specification of the present disclosure.

DESCRIPTION OF EMBODIMENTS

In some embodiments of this application, a network distribution method for an electronic device and a router provided in embodiments of this application is described with an example in which the electronic device is a smart camera and the router is a HiLink router. It may be understood that, in addition to the HiLink router, the router in this application may alternatively be another electronic device that has a routing function, for example, a computer, a mobile phone, or a smart household that has a routing function.

Figure 1:
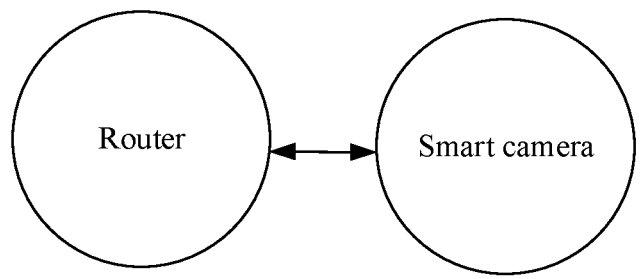
FIG. 1 is a schematic diagram of a structure of a network distribution system including a router and a smart camera according to an embodiment of this application.

FIG. 1 is a schematic diagram of a structure of a network distribution system including a router and a smart camera according to an embodiment of this application.

The smart camera (as a first electronic device) is a smart household, and has a networking function to implement network distribution with the router (as a second electronic device) and be connected to the router. In this embodiment of this application, that the router is a HiLink router is used as an example for description. After network distribution between the smart camera and the HiLink router succeeds, the HiLink router provides a wireless network for the smart camera. After the smart camera is connected to the wireless network provided by the HiLink router, a user may bind the smart camera by using an application (application, APP) in a mobile phone terminal, to remotely monitor a real-time dynamic condition in a home of the user. In addition, the smart camera can further capture a dynamic condition of a door/window in the home. If the door/window is opened, the smart camera takes a photo. The user can further control the smart camera by using the APP in the mobile phone terminal, to enable and disable the smart camera, adjust a shooting angle, and the like. For the electronic device in this embodiment of this application, the electronic device may alternatively be another smart household that has a routing function, for example, a single smart household product such as an electric curtain, an electric window, a smart door lock, a smart sound, a smart vacuum cleaning robot, or a smart air purifier.

In some embodiments of this application, a process in which the smart camera is used as a to-be-networked smart household, to implement network distribution with the router is as follows: The smart camera is used as the to-be-networked smart household, to first broadcast and send a probe request (Probe Request) as a second probe request, and extend and customize an information element IE 1 in the probe request that is broadcast and sent. After finding the probe request that carries the customized information element IE 1, the HiLink router first replies one probe response as a second probe response, and notifies the smart camera that the HiLink router finds the smart camera and agrees that the smart camera performs network distribution. A Hi button (as a first control) of the HiLink router is lit up to prompt the user to trigger the Hi button for network distribution. The probe response is in a standard Wi-Fi frame format, namely, an IEEE 802.11 protocol frame format. A probe response in the IEEE 802.11 protocol frame format is used as a response to reply to the smart camera.

The user triggers the Hi button, and the smart camera still continuously broadcasts the probe request (as a first probe request). When the HiLink router is in an AP mode when in a factory default state and starts to perform network distribution, the HiLink router opens a temporary SSID, and replies, to the smart camera, a probe response (Probe Response) that carries an extended customized IE 2 as a first probe response for the probe request. The IE 2 carries temporary networking data, where the temporary networking data includes but is not limited to a temporary service set identifier (Service Set Identifier, SSID) and a specified channel, and the temporary service set identifier is referred to as a temporary SSID (as a first SSID) for short hereinafter. The router and the smart camera establish a communication connection as a first connection by using the temporary SSID and the specified channel, to provide a temporary network for the smart camera.

The smart camera switches to a station (Station, STA) mode and accesses the temporary SSID, and the HiLink router transmits network distribution data of a master access point of the HiLink router to the smart camera by using the temporary SSID, where the network distribution data of the master access point includes but is not limited to an SSID and a password of the master access point.

After receiving the SSID (as a second SSID) and the password of the master access point of the HiLink router, the smart camera establishes a second connection to the router by using the SSID and the password of the master access point of the router, to access a network of the master access point of the HiLink router. In addition, the smart camera is disconnected from the temporary network to complete network distribution with the HiLink router.

In the network distribution method for the smart camera and the router in this embodiment of this application, the user needs to trigger only the Hi button to start a network distribution procedure, to implement network distribution between the HiLink router and the smart camera without operating the application in the mobile phone. Therefore, an operation is simple, network switching is not required, and accessibility is good.

The following describes specific structures of the smart camera and the HiLink router.

Figure 2:
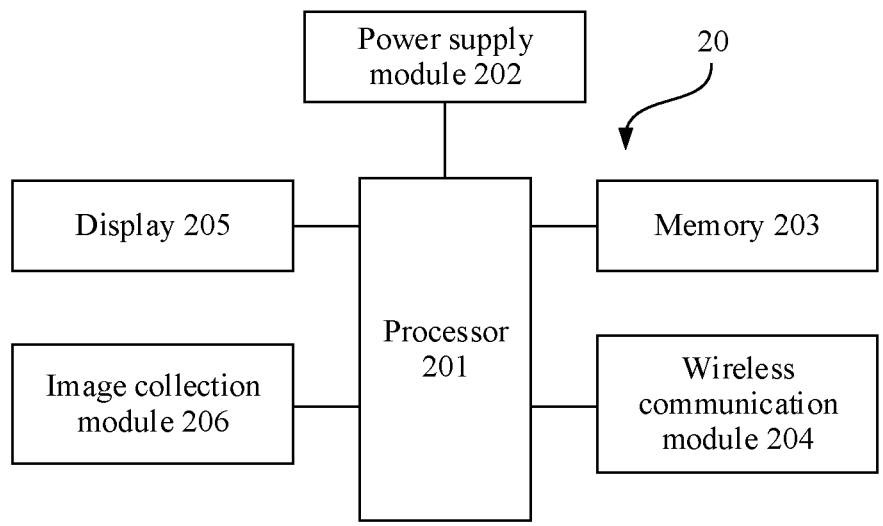
FIG. 2 is a schematic diagram of a structure of a smart camera in an application scenario according to an embodiment of this application.

First, FIG. 2 is a schematic diagram of a structure of a smart camera in an application scenario according to an embodiment of this application. The smart camera 20 includes a processor 201, a power supply module 202, a memory 203, a wireless communication module 204, a display 205, an image collection module 206, and the like.

In some embodiments of this application, the processor 201 may provide one or more processing units that are used in the smart camera 20. For example, the processor 201 includes but is not limited to a processing module or a processing circuit, for example, a central processing unit (Central Processing Unit, CPU), a graphics processing unit (Graphics Processing Unit, GPU), a digital signal processor (Digital Signal Processor, DSP), a microprocessor (Micro-programmed Control Unit, MCU), an artificial intelligence (Artificial Intelligence, AI) processor, or a programmable logic device (Field Programmable Gate Array, FPGA). Different processing units may be independent devices, or may be integrated into one or more processors. A storage unit may be disposed in the processor 201 to store instructions and data. In some embodiments, the memory in the processor 201 is a cache. It should be noted that the processor 201 may alternatively be used as a controller, and the processor 201 may control the smart camera 20 to switch between an AP mode and a STA mode. When the smart camera is in the AP mode, the wireless communication module 204 is controlled to send a probe request, and extend an IE 1 in the probe request. The processor 201 may further control the wireless communication module 204 of the smart camera 20 to access a temporary SSID. After the smart camera switches to the STA mode, the processor 201 may control the wireless communication module 204 of the smart camera 20 to be disconnected from the temporary SSID, and control the wireless communication module 204 to access an SSID of a master access point of a HiLink router.

In some embodiments of this application, the power supply module 202 may provide a battery, a battery management component, and the like that are used in the smart camera 20. The power supply management component is configured to manage charging of a power supply and power supply performed by the power supply for another module. The battery may be a rechargeable battery, for example, a lithium battery or a lead-acid battery. A shape of the battery may be but is not limited to a button type or a square type. The battery is configured to supply power to each component of the smart camera 20.

In some embodiments of this application, the memory 203 may include one or more tangible and non-temporary computer-readable media configured to store data and/or instructions. In some embodiments, the memory 203 includes but is not limited to any suitable non-volatile memory, for example, a flash memory, and/or any suitable non-volatile storage device, for example, at least one of a hard disk drive (hard disk drive, HDD), a compact disc (compact disc, CD) drive, or a digital versatile disc (digital versatile disc, DVD) drive. The memory 203 may store basic product information such as a product model, a parameter, a manufacturer, a device identity document (Identity document, ID), and a production number of the smart camera 20 as data in a customized IE 1. In other words, the IE 1 includes the basic product information of the smart camera 20, so that the HiLink router can find the smart camera 20.

In some embodiments of this application, the wireless communication module 204 may provide wireless communication solutions that are applied to the smart camera 20, such as a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), and near field communication (near field communication, NFC). The smart camera 20 may communicate with a mobile phone, a remote controller, and the like by using a wireless communication technology and a network. In some embodiments of this application, the wireless communication module 204 may be a Bluetooth chip, and a communication manner is Bluetooth communication. To reduce power consumption caused by the Bluetooth chip to the smart camera 20, the Bluetooth chip may be a low-power consumption Bluetooth chip, and a low-power consumption Bluetooth chip whose model is NRF52810-QFAA-R Bluetooth 5.0 may be selected. The wireless communication module 204 is configured to perform network interconnection with the HiLink router, to access a wireless network provided by the HiLink router.

In some embodiments of this application, the display 205 may be used in the smart camera 20 to display a man-machine interaction interface and the like. The display 205 includes but is not limited to a display panel. The display panel may be a liquid crystal display (liquid crystal display, LCD), an organic light-emitting diode (organic light-emitting diode, OLED), an active-matrix organic light emitting diode (active-matrix organic light emitting diode, AMO-LED), a flexible light-emitting diode (flex light-emitting diode, FLED), a mini-LED, a micro-LED, a micro-OLED, a quantum dot light emitting diode (quantum dot light emitting diodes, QLED), or the like.

In some embodiments of this application, the image collection module 206 includes but is not limited to a lens part, a chip group part, a printed circuit board (Printed Circuit Board, PCB), and a component part. The lens part includes but is not limited to a lens module. The lens module includes lenses (a convex lens and a concave lens). Lenses may be classified into plastic lenses and glass lenses based on materials. Lens modules may be classified into colored lens modules and monochromatic lens modules based on colors. Lens modules may be classified into fixed lens modules and zoom lens modules based on functions. Lens modules may be classified into board lens modules and pinhole lens modules based on sizes. Lens modules may be classified into 850 nm lens modules, 940 nm lens modules, and 650 nm lens modules based on infrared. The chip group part is a heart part of the camera, and is a main component that converts an optical signal into an electrical signal. Main chip groups are classified into charge coupled device (Charge Coupled Device, CCD) chips and complementary metal oxide semiconductor (Complementary Metal Oxide Semiconductor, CMOS) chips based on features of photosensitive chips in the chip groups. The PCB and the component part are important components of the camera, and are carriers of all devices. A main function of the PCB and the component part is to provide a mutual electrical connection between parts. The image collection module 206 is used to collect an image in a shooting range of the image collection module 206, and transmit the shot image to a user at a mobile phone terminal by using the wireless network provided by the HiLink router, so that the user performs remote control.

Figure 3:
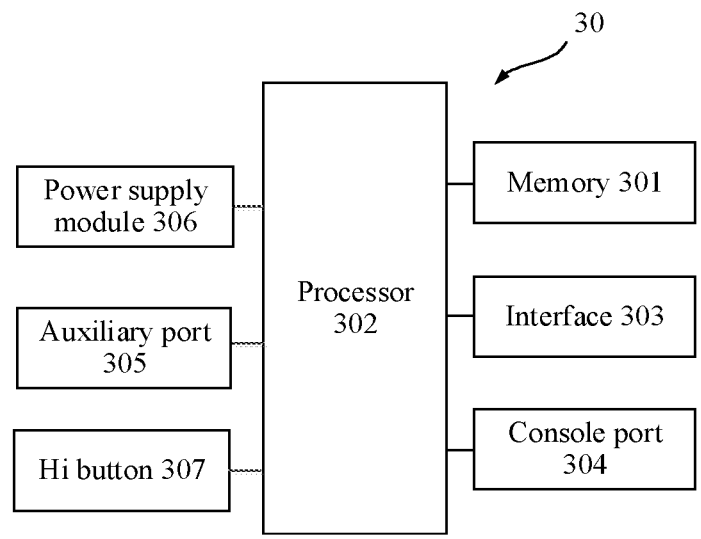
FIG. 3 is a schematic diagram of a structure of a HiLink router according to an embodiment of this application.

Next, FIG. 3 is a schematic diagram of a structure of a HiLink router according to an embodiment of this application.

The HiLink router 30 includes a memory 301, a processor 302, an interface 303, a console port 304, an auxiliary port 305, a power supply module 306, and a Hi button 307.

It may be understood that the HiLink router 30 is not specifically limited to the structure illustrated in this embodiment of this application. In some other embodiments of this application, the HiLink router 30 may include more or fewer components than those shown in the figure, combine some components, split some components, or have a different component arrangement. The components shown in the figure may be implemented by using hardware, software, or a combination of software and hardware. In addition to performing network distribution by triggering the HiLink router 30 by using the Hi button 307, a user may alternatively perform network distribution by operating another button of the router or in a voice manner.

In some embodiments of this application, the memory 301 may use a non-volatile memory, a random access memory, a flash memory, or a read-only memory. The random access memory discards information about the router when the router starts or supplies power. The read-only memory stores startup software of the router. The startup software is first software run by the router, and is responsible for a normal operation state of the router. The router stores a complete operating system as a backup in the random access memory, so that when the operating system cannot be used, the backup can be used. The read-only memory is usually disposed on one or more chips, and is welded on a mainboard of the router. The flash memory is mainly used to store an operating system of the HiLink router 30, to maintain normal operation of the router. If the flash memory is mounted in the router, the flash memory is mainly used to guide a default position of the operating system of the router. A plurality of operating system images may be stored to provide a plurality of startup options, provided that the flash memory has a sufficient capacity. The operating system of the HiLink router 30 uses a Linux operating system. A main function of the non-volatile memory is to store configuration data (a startup configuration) read when the operating system is started. The random access memory is mainly used as an operating system table and a buffered storage area. The operating system may meet all conventional storage requirements by using the random access memory, so that the router can quickly access information. A storage speed of the random access memory is faster than those of the foregoing three memories.

The processor 302 may include one or more processing units, for example, may include a processing module or a processing circuit, for example, a central processing unit CPU (Central Processing Unit), a graphics processing unit GPU (Graphics Processing Unit), a digital signal processor (digital signal processor, DSP), a microprocessor MCU (Micro-programmed Control Unit), an AI (Artificial Intelligence, artificial intelligence) processor, or a programmable logic device FPGA (Field Programmable Gate Array). Different processing units may be independent devices, or may be integrated into one or more processors. A storage unit may be disposed in the processor 302, to store instructions and data. In some embodiments, the storage unit in the processor 302 is a cache. The processor 302 of the HiLink router 30 is configured to control the Hi button to be lit up, and extend an IE 2 in a probe response for a probe request broadcast and sent by a smart camera, to provide a temporary SSID and an SSID of a master access point for the smart camera.

The interface 303 of the HiLink router 30 has a name and a number. A full name of one interface includes a type sign and a numeral number of the interface, and the number starts from 0. For a router with a fixed interface or a modular interface, a full name of the interface uses only one figure, and the interface is numbered based on a physical order of the interface in the router. For example, Ethernet0 represents a first Ethernet interface, and Serial1 represents a second serial port. For a router that supports "online plug and deletion" or that can change a physical interface configuration, a full name of an interface of the router includes at least two figures, and the two figures are separated by a slash "/", where a first figure represents a number of a slot, and a second figure represents a number of a port in an interface card. For a router that supports a "versatile interface processor", a number form of an interface of the router is "slot/port adapter/port number", for example, Ethernet4/0/1 represents a second Ethernet interface of a first port adapter on a slot 4.

The console port 304 enables the user or an administrator to communicate with the HiLink router 30 by using a network access device, to complete a configuration of the router. The port provides an EIA/TIA-232 asynchronous serial interface for a configuration on the HiLink router 30.

The auxiliary port 305 is similar to the console port 304, and also provides an EIA/TIA-232 asynchronous serial interface. A difference lies in that the auxiliary port 305 is usually configured to connect to a modem to implement remote management of the router.

The power supply module 306 may include a power supply, a power supply management component, and the like. The power supply management component is configured to manage charging of the power supply and power supply performed by the power supply for another module.

Then, back to the scenario shown in FIG. 1. The following describes a network distribution process between the smart camera and the HiLink router shown in FIG. 2 and FIG. 3.

The smart camera 20 as a to-be-networked smart household is set to an AP mode when in a factory default state. In the AP mode, the smart camera 20 actively broadcasts and sends a probe request (Probe Request) by using the wireless communication module 204 on a full-channel basis, and extends and customizes an information element IE 1 in the probe request that is broadcast and sent. After finding the probe request that carries the customized information element IE 1, the HiLink router 30 parses the probe request, and replies one probe response to the smart camera 20. The probe response that is replied for the first time is merely used to notify the to-be-networked smart camera device that a device finds the to-be-networked smart camera device, and agrees to perform network distribution with the to-be-networked smart camera device. In addition, the HiLink router 30 prompts a user by lighting up the Hi button of the HiLink router 30, to trigger the Hi button for network distribution. The customized information element IE 1 includes a device ID (which may be a production number) of the smart camera 20 and basic device information (such as a model/version, a manufacturer, and a device name) of the smart camera 20.

After the user triggers the Hi button, the HiLink router 30 starts to perform network distribution. The router opens a temporary SSID, replies to the probe request broadcast and sent by the smart camera 20, and customizes and extends an IE 2 in the probe response (Probe Response), so that the temporary SSID is carried in the IE 2. The customized information element IE 2 includes the temporary SSID and a channel that are allocated by the router 30 for the smart camera 20.

After receiving the probe response that is fed back by the HiLink router 30 and in which the IE 2 is extended, the smart camera 20 switches to a STA mode, parses the temporary SSID carried in the IE 2 in the probe response, and accesses a temporary network and the specified channel by using the temporary SSID. The HiLink router 30 transmits the SSID and the password of the master access point of the HiLink router 30 to the smart camera 20 by using the temporary SSID. After receiving the SSID and the password of the master access point of the HiLink router 30, the smart camera 20 accesses a network of the master access point of the HiLink router 30 by using the SSID and the password of the master access point of the router, completes network distribution with the HiLink router 30, and is finally disconnected from the temporary network.

An IE (Information Element) is a data segment that is extended in a probe request or a probe response. In some embodiments of this application, extended IEs include an extended IE 1 and an extended IE 2, and field formats of the extended IE 1 and the extended IE 2 are as follows:

| Tag number | Length | Organizationally unique identifier (OUI) | Vendor specific type | Data |
| --- | --- | --- | --- | --- |

The Tag number is used to identify that a Wi-Fi management frame is customized and extended. For example, a value of the Tag number may be 0xDD, namely, decimal 221.

The Length is used to identify a data length.

The OUI is used to identify a manufacturer, and includes a manufacturer of a smart household, for example, the smart camera 20 or the HiLink router 30. For example, an OUI of a manufacturer of a specific AI camera may be AC-85-3D. The customized extended information element IE 1 includes the manufacturer of the smart camera 20, and the customized extended information element IE 2 includes the manufacturer of the HiLink router 30.

The Vendor specific type is used to identify a specific customized type. In this application, the specific customized type may be used to mark that the extended IE 1 and the extended IE 2 are used for SOFT AP network distribution. The router 30 determines, based on the Vendor specific type, whether the probe request sent by the smart camera 20 is a network distribution request for performing network distribution with the router 30. For example, the Vendor specific type in each of the extended IE 1 and the extended IE 2 is defined as 19, that is, it is identified that the probe request or the probe response is used by the router 30 and the smart camera 20 for SOFT AP network distribution.

Specifically, after receiving the probe request that is sent by the smart camera 20 and that carries the extended IE 1, the HiLink router 30 reads the Vendor specific type field. If the Vendor specific type field is 19, it indicates that, in this case, the probe request sent by the smart camera 20 is a request for performing SOFT AP network distribution with the router 30. The smart camera 20 is allowed to perform network distribution. Then, the Data after the Vendor specific type field is continuously parsed. If the Vendor specific type field is not 19, it indicates that, in this case, the probe request sent by the smart camera 20 is not a network distribution request for performing network distribution with the router 30. In some embodiments of this application, the probe request may be directly discarded or another function of the probe request may be implemented.

The Data is used to identify extended data. For the extended IE 1, extended data may include at least the device ID of the smart camera 20 and the basic device information of the smart camera 20 (such as a device type, a model, a version, a manufacturer, and a device name). For example, a device ID of the specific AI camera may be "101q". The device type refers to a type to which a device belongs. For example, the smart camera 20 belongs to a camera type, and a device type of the smart camera 20 may be represented as "027"; the HiLink router 30 belongs to a router type, and a device type of the HiLink router 30 may be represented as "1"; and a Huawei mobile phone P30 belongs to a mobile phone type, and a device type of the Huawei mobile phone P30 may be represented as "14". For the extended IE 2, extended data may include at least the temporary SSID and the channel that are allocated by the router 30 for a to-be-networked device.

For example, the Tag number, the Length, and the Vendor specific type each occupy one byte, the OUI occupies three bytes, the Data occupies 0 to 252 bytes, and a data length of the Length is a sum of bytes of the Length, the OUI, the Data, and the Vendor specific type.

The following describes the field format of the extended IE 1 in the probe request with an example in which the smart camera 20 is an AI camera. Device information of the AI camera includes at least one piece of the following information: An OUI of a manufacturer is AC-85-3D), a device ID is "101q", and a device type is "027". The field format of the extended IE 1 in the probe request sent by the AI camera as the smart camera is as follows:

| Tag number | Length | Organi-zationally unique identifier (OUI) | Vendor specific type | Data |
|---|---|---|---|---|
| 0 × DD | 0 × 0D | AC-85-3D | 0 × 13 | 0 × 0104313031710203303237 |

The Tag number may be defined as hexadecimal 0xDD, namely, decimal 221. A data length defined by the Length may be WD. The OUI of the manufacturer is defined as AC-85-3 (which is, for example, provided by the manufacturer of the smart camera), and AC-85-3D may specifically be first three bytes of a local area network (MediaAccess Control, MAC) address of a device (the smart camera). An identifier that is in the Vendor specific type of the extended IE 1 and that is used for SOFT AP network distribution is defined as hexadecimal 0X13. The Data of the extended IE 1 is specifically shown in Table 1.

TABLE 1

| Number T | Byte length L | V | Description |
|---|---|---|---|
| 1 | 4 | The device ID "101q" corresponds to ASCII: 0 × 31303171 | The device ID: Tripartite ecology is uniformly distributed by the manufacturer, and the to-be-networked device needs to carry the device ID. For example, the device ID of the specific AI camera is 101q. |
| 2 | 3 | The device type "027" corresponds to ASCII: 0 × 303237 | The device type is used to identify a device type (type ID), for example, the device type of the camera is "027" (a character string). |

In Table 1, different numbers Tare used to identify types of information about a device, for example, are used to identify that the types of the information about the device are the device ID and the device type or other information, and each occupy one byte (byte). The byte length L represents a quantity of bytes occupied by a character string of the device ID, the device type, or other information, and occupies one byte. V represents the character string of the device ID and the corresponding ASCII or the character string of the device type and the corresponding ASCII.

For example, the number "1" identifies that the type of the information about the device is the device ID; and the byte length "4" identifies that the device ID "101q" occupies four bytes. V identifies that the device ID is the character string "101q", and the ASCII corresponding to the device ID is 0x31303171. The type that is of the information about the device and that is identified by the number "2" is the device type; and the byte length "3" identifies that the device type "027" occupies three bytes. V identifies that the device type is the character string "027", and the ASCII corresponding to the device type is 0x303237.

It can be learned that the Data of the extended IE 1 is 0x0104313031710203303237 based on the number "1", the byte length "4", the ASCII of the device ID, the number "2", the byte length "3", and the ASCII of the device type. "0x" represents hexadecimal. A byte quantity of the Data of the extended IE 1 is 11.

Certainly, the field format of the extended IE 1 may alternatively be set to another format. In addition to carrying the device ID and the device type, the Data of the extended IE 1 can also carry other information such as a device name (for example, AI camera) and a production number of the device. This is not limited in this embodiment of this application.

Then, the field format of the extended IE 2 carried in the probe response and the probe response is described with an example in which the HiLink router 30 is a WS5200 quad-core version. The manufacturer of the HiLink router 30 of the WS5200 four-core version is 00-E0-FC (indicating, for example, a Huawei manufacturer), the device model is WS5200, and the device ID is 100005625634.

For the probe response that carries the extended IE 2, the Data of the extended IE 2 may carry at least the temporary SSID and a specified channel number that are allocated by the HiLink router 30 for the smart camera. For example, the temporary SSID may be an SSID character string of the smart camera and a current SoftAP of the router, for example, "TEST-SOFTAP", and the specified channel number may be a number "11" of a channel in which the smart camera and the current SoftAP of the router are located.

Certainly, the Data of the extended IE 2 may further carry data such as device information of the HiLink router 30, for example, at least one of a device ID, a production number, a model, or a device name.

The field format of the extended IE 2 carried in the HiLink router 30 of the WS5200 quad-core version is as follows:

| Tag number | Length | Organizationally unique identifier (OUI) | Vendor specific type | Data |
|---|---|---|---|---|
| 0 × DD | 0 × 10 | 00-E0-FC | 0 × 13 | 0 × 010B544553542D534F4654415002010B |

The Tag number may be defined as hexadecimal 0xDD, namely, decimal 221. A data length defined by the Length may be 0X10. A manufacturer defined by the OUT is 00-E0-FC (which is provided by the manufacturer of the router). An identifier that is in the Vendor specific type carried in the extended IE 2 and that is used for SOFT AP network distribution is defined as 0X13. The Data of the extended IE 2 is specifically shown in Table 2.

TABLE 2

| Number T | Byte length L | V | Description |
|---|---|---|---|
| 1 | 11 (0 B) | The temporary SSID: 0 × 544553542D534F46544150 | The temporary SSID character string of the smart camera and the current SoftAP: "TEST-SOFTAP" |
| 2 | 1 | The specified channel number: 0 × 0B | The number of the channel in which the smart camera and the current SoftAP are located: 11 |

In Table 2, different numbers T are used to identify different types of data carried in the IE 2, for example, the different numbers T identify that a type of data carried in the IE 2 is the temporary SSID, the specified channel number, or other information, and each occupy one byte. The byte length L represents a quantity of bytes occupied by a character string of the temporary SSID, the specified channel number, or the other information, and occupies one byte. V represents the ASCII of the temporary SSID, the ASCII of the specified channel number, or ASCII of the other information.

For example, the type that is of the data carried in the IE 2 and that is identified by the number "1" is the temporary SSID; and the byte length "11 (0 B)" identifies that the temporary SSID occupies 11 bytes. V identifies that the character string of the temporary SSID is "TEST-SOFTAP", and the corresponding ASCII is "0x544553542D534F46544150".

The type that is of the data carried in the IE 2 and that is identified by the number "2" is the specified channel number; and the byte length "1" identifies that the specified channel number occupies one byte. V identifies that the character string of the specified channel number is "11", and the corresponding ASCII is "0x0B".

It can be learned that the Data of the extended IE 2 is "0x010B544553542D534F4654415002010B" based on the number "1", the byte length "0 B", the ASCII of the temporary SSID, the number "2", the byte length "1", and the ASCII of the specified channel number. "0x" represents hexadecimal. A byte quantity of the Data of the IE 2 is 16.

In addition to carrying the SSID and the specified channel of the HiLink router 30, the Data of the extended IE 2 can further carry the device information of the HiLink router 30, such as the device ID, the model, and the device name.

It should be noted that the Tag number and the Vendor specific type may alternatively be defined as other identifiers. This is not limited in this embodiment of this application. In addition to the foregoing information in this embodiment of this application, the field formats and carried content of the extended IE 1 and the extended IE 2 may further carry other information. This is not limited in this embodiment of this application.

Compared with a network distribution method for a conventional smart household and a router in the conventional technology, the following describes an effect of a network distribution method for a smart household and a router in this application with a smart camera and a HiLink router as examples.

Figure 4A:
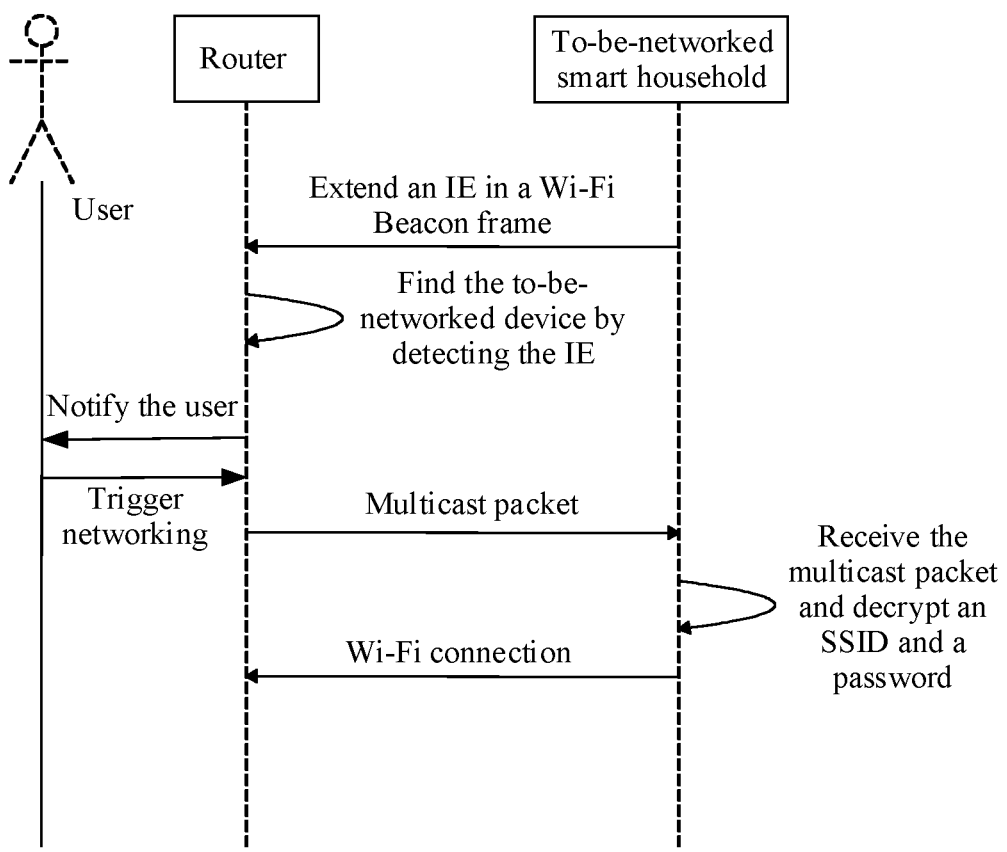
FIG. 4(a) is a schematic flowchart of performing network distribution on a smart household through multicast network distribution in the conventional technology.
Figure 4B:
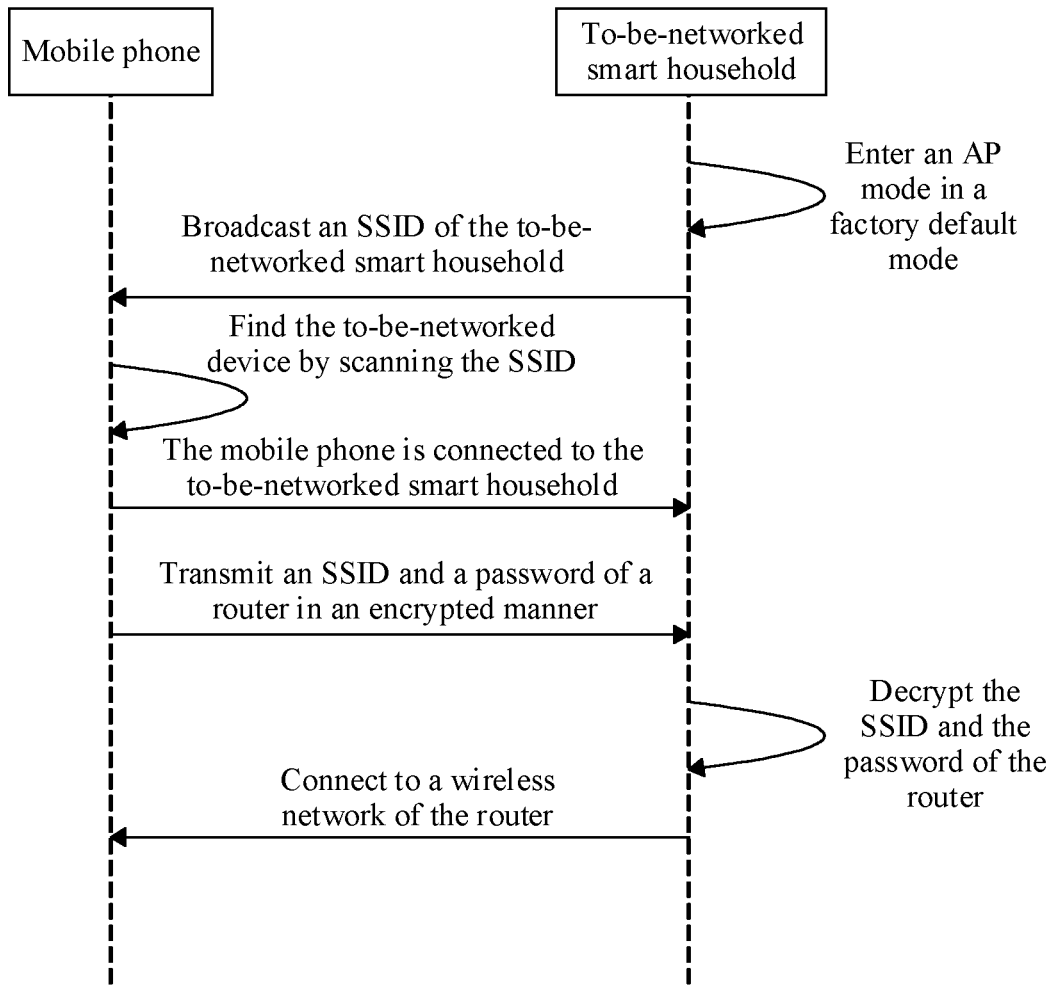
FIG. 4(b) is a schematic flowchart of performing network distribution on a smart household in a wireless soft AP manner in the conventional technology.

FIG. 4(a) is a schematic flowchart of performing network distribution on a smart household through multicast network distribution in an implementation. FIG. 4(b) is a schematic flowchart of performing network distribution on a smart household in a wireless soft AP manner in another implementation.

Currently, network distribution manners for network distribution between a smart household and a router may be classified into multicast network distribution and wireless soft-access point (Soft-Access Point, Soft-AP) network distribution. As shown in FIG. 4(a), a to-be-networked smart household extends a data segment (Information Element, IE) in a Wi-Fi beacon (Beacon) frame, and performs automatic multicast. A router finds a to-be-networked device by detecting the IE, and notifies a user to trigger networking. In an implementation provided in this application, a Data of the IE carries an ID of the to-be-networked smart household and a specific SSID (for example, huaweiet) that identifies the to-be-networked smart household for networking. The router finds the to-be-networked device by detecting the device ID and the specific SSID that are carried in the IE of the to-be-networked smart household. A Vendor specific type in the IE carries an identifier for multicast network distribution of the to-be-networked smart household, so that the router identifies that the to-be-networked smart household needs to perform multicast network distribution.

A manner of notifying the user to trigger networking may be that an indicator of the router is lit up. The user can trigger, by triggering a Hi button, a WPS button, or the like of the router, the router for networking.

After the user triggers the router for networking, the router sends network distribution information to the to-be-networked smart household by using a multicast packet, and the to-be-networked smart household scans the multicast packet and parses the multicast packet to complete network distribution. The multicast packet carries an SSID and an access password that are of an AP and that are allocated by the router for the to-be-networked smart household. The SSID is a name of a local area network in which the router is located. The to-be-networked smart household accesses, by using the access password and the SSID, the local area network provided by the router.

In the multicast network distribution manner, the to-be-networked device needs to listen to the multicast packet on a full-channel basis (full-channel refers to all channels when the to-be-networked device and the router perform multicast network distribution). After the multicast packet is listened on a specific channel, the to-be-networked device immediately stays on the channel and uses the channel as a fixed channel. After the to-be-networked device stays on the channel, the router and the to-be-networked device exchange data through the fixed channel. However, the multicast network distribution manner is vulnerable to a malicious attack and is unidirectional multicast. The multicast packet is broadcast on the full-channel basis, and when any device wants to access a multicast network between the router and the to-be-networked device, only an IP address of the device needs to be changed to a multicast address of the network. The multicast network distribution manner has low security. Therefore, the multicast network distribution manner is gradually eliminated.

As shown in FIG. 4(b), that a to-be-networked smart household performs network distribution in a SOFT AP manner gradually becomes a mainstream manner. When the to-be-networked smart household performs network distribution in the SOFT AP manner, a SOFT AP application (APP) needs to be installed in a mobile phone or computer, and network distribution between the to-be-networked smart household and a router is implemented by using the APP in the mobile phone or computer. Specifically, the to-be-networked smart household enters an AP mode when in a factory default state, the to-be-networked smart household broadcasts an SSID of an AP of a to-be-networked device, the SOFT AP APP installed in the mobile phone or computer is connected to the to-be-networked smart household by scanning the SSID of the AP of the to-be-networked smart household, an SSID and a password of the router are transmitted to the to-be-networked device in an encrypted manner by using a network of the to-be-networked smart household, and the to-be-networked smart household receives, by using the SSID of the to-be-networked smart household, the SSID and the password that are of the router and that are transmitted by the mobile phone or computer, to perform decryption. In this case, the mobile phone or computer is disconnected from the SSID of the AP of the to-be-networked smart household, and is connected to an original network of the mobile phone or computer again. The to-be-networked smart household accesses a network of the router by using the decrypted SSID of the router, to complete network distribution. When network distribution is performed in the SOFT AP manner, network distribution between the to-be-networked smart household and the router needs to be completed with the help of the third-party mobile phone or computer. In this case, a network distribution operation is tedious. In addition, when network distribution is performed on the to-be-networked smart household by using the mobile phone or computer, a network that the mobile phone and the computer currently access needs to be switched to a network broadcast by the to-be-networked smart household. Because some mobile phones or computers have a compatibility problem, network distribution is prone to failing. Consequently, network distribution accessibility of this network distribution manner is poor. In addition, after the mobile phone and the computer complete network distribution, the mobile phone often cannot be connected to the original network. Consequently, user experience is poor.

In a network distribution method disclosed in embodiments of this application, a smart camera extends an IE 1 in a probe request, a HiLink router feeds back, to the smart camera for the probe request, one probe response that carries an extended IE 2, the smart camera accesses a temporary network (as a first connection) by using a temporary SSID and a password (the temporary SSID and the password are used as temporary networking data) that are carried in the extended IE 2, the HiLink router transmits an SSID and a password of a master access point (the SSID and the password of the master access point are used as network distribution data) of the HiLink router to the smart camera by using the temporary network, and the smart camera accesses a network (as a second connection) of the master access point of the HiLink router by using the SSID and the password of the master access point, to complete network distribution. In one aspect, in the network distribution method provided in embodiments of this application, a user needs to trigger only a Hi button to start a network distribution procedure, to implement network distribution between the HiLink router 30 and the smart camera 20 without operating an application in a mobile phone. Therefore, an operation is simple, and network distribution reliability is high. In another aspect, in embodiments of this application, when network distribution is performed between the smart camera 20 and the HiLink router 30, the HiLink router in this application feeds back the SSID and the password of the master access point to the smart camera by using the temporary SSID carried in the probe response. Therefore, network distribution security is higher.

The following further describes, with reference to an accompanying drawing, a method in which a HiLink router finds a to-be-networked smart camera according to a specific implementation of this application.

Figure 5:
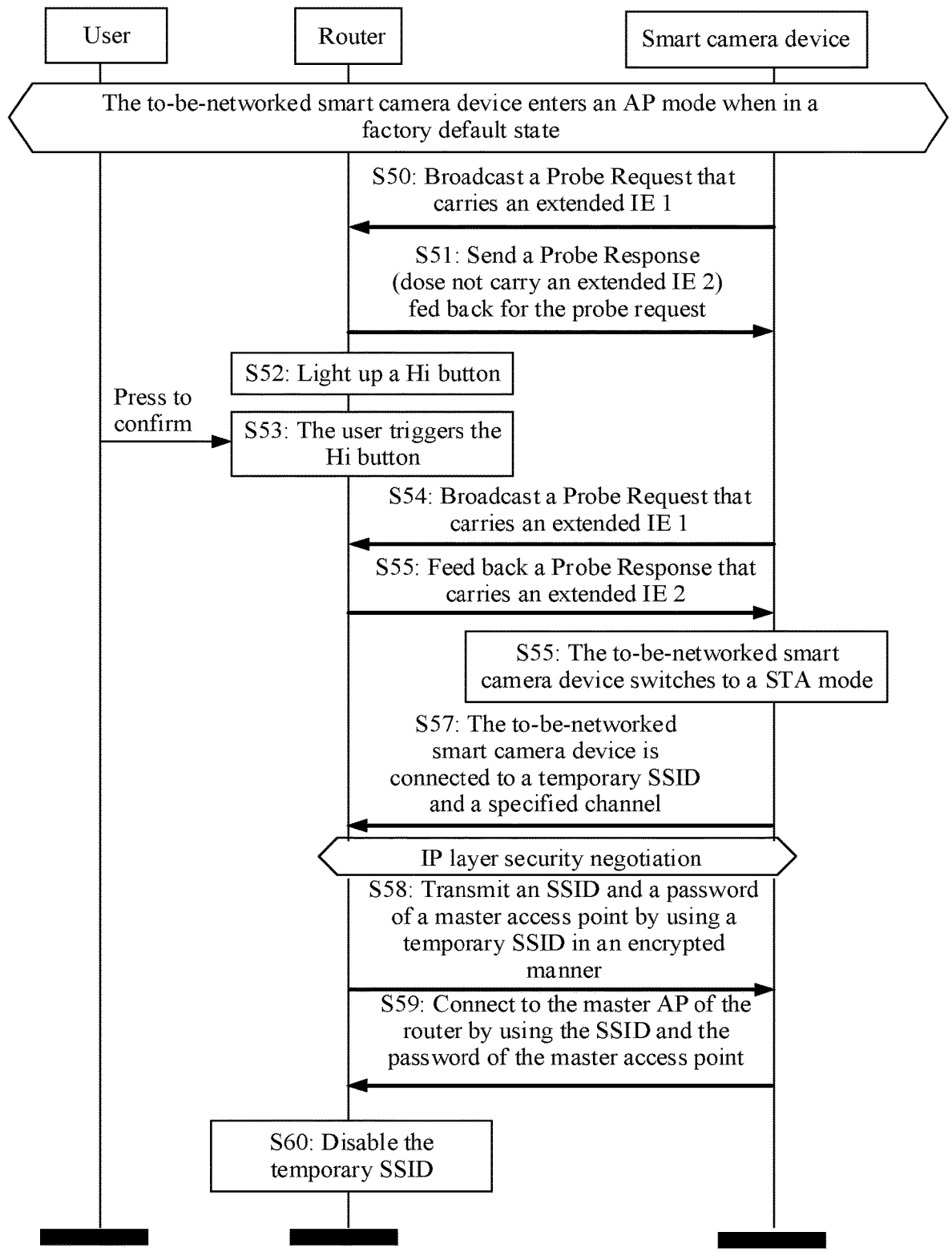
FIG. 5 is a schematic diagram of a thread in which a HiLink router finds a to-be-networked smart camera according to an embodiment of this application.

FIG. 5 is a schematic diagram of a thread in which a HiLink router finds a to-be-networked smart camera, and completes network distribution with the to-be-networked smart camera according to an embodiment of this application.

The following describes, with reference to FIG. 5 and with the HiLink router as an example, detailed steps of network distribution between a router (a second electronic device) and the to-be-networked smart camera (a first electronic device):

S50: The to-be-networked smart camera device is in an AP mode when in a factory default state. After entering the AP mode, the to-be-networked smart camera device continuously automatically broadcasts, in a full-time broadcast manner on a full-channel basis, a probe request (Probe Request) that carries an extended field 1 (Information Element 1, IE 1) as a second probe request. The extended IE 1 is used by the smart camera to broadcast device information of the smart camera, and the device information included in the extended IE 1 includes basic device information of the to-be-networked smart camera (such as a device ID, a device type, a model, a version, a manufacturer, and a device name). In this way, each device located in a same local network can find the to-be-networked smart camera device. For a field format of the extended IE 1, refer to the descriptions in the foregoing embodiment.

Further, the to-be-networked smart camera device may alternatively not use the full-time broadcast manner, but periodically automatically broadcasts, on a full-channel basis, the probe request that carries the extended IE 1. The to-be-networked smart camera device may periodically automatically broadcast, on the full-channel basis at a time interval of 5 or 10 seconds, the probe request that carries the extended IE 1.

S51: After receiving the probe request, the router (which may be the HiLink router) finds the probe request that carries the customized extended information element IE 1 to determine existence of the smart camera. The HiLink router feeds back, on a fixed channel of the HiLink router, a second probe response Probe Response as a response for the probe request to the to-be-networked smart camera device. Herein, the second probe response Probe Response is merely used to notify the to-be-networked smart camera device that a device finds the to-be-networked smart camera device, and agrees that the to-be-networked smart camera device performs network distribution.

S52: After receiving the probe request, the router (which may be the HiLink router) parses the probe request that carries the customized extended information element IE 1, and determines, by parsing the extended IE 1, whether the probe request is a network distribution request for performing network distribution with the HiLink router, where if the probe request is a network distribution request for performing network distribution with the router, it indicates that the router can perform network distribution with the to-be-networked smart camera device. In this case, an indicator, a button, or the like of the router is lit up to prompt a user to trigger the button for network distribution. For example, a Hi button of the HiLink router is lit up to prompt the user to trigger the Hi button for network distribution. The lighting up the Hi button of the HiLink router is specifically that the user is prompted in a manner of lighting up the Hi button.

That whether the probe request is a network distribution request for performing network distribution with the HiLink router is specifically as follows:

For example, the foregoing Vendor specific type is used to identify a specific customized type. The specific customized type is used to mark that the extended IE 1 and an extended IE 2 are used for SOFT AP network distribution, and the router determines, by using the identifier of the Vendor specific type field in the probe request, whether the probe request is a network distribution request for performing SOFT AP network distribution. For example, the Vendor specific type in the IE 1 is defined as 19 (decimal), that is, it is identified that the probe request is used for SOFT AP network distribution with the router. After receiving the probe request that is sent by the smart camera and that carries the extended IE 1, the HiLink router reads the Vendor specific type field. If the Vendor specific type field is 19, it indicates that, in this case, the probe request is a network distribution request for performing SOFT AP network distribution with the router.

It should be noted that S51 and S52 may be performed synchronously, or S52 may be performed first, and then S51 is performed. A sequence of S51 and S52 is not limited in this embodiment of this application.

In addition to prompting the user in the manner of lighting up the Hi button, the user may alternatively be prompted in a manner of flashing the indicator of the router, by using a voice, or the like. This is not limited in this embodiment of this application.

S53: The user triggers the Hi button.

S54: After the Hi button of the router (which may be the HiLink router) is triggered, the HiLink router starts to perform network distribution with the smart camera, and the to-be-networked smart camera device in the AP mode still continuously automatically broadcasts, in the full-time broadcast manner on the full-channel basis, the probe request that carries the extended IE 1 as a first probe response.

It may be understood that content of the probe request in which the IE 1 is extended and that is obtained before the Hi button of the HiLink router is triggered may be the same as content of the probe request that carries the extended IE 1 and that is obtained after the Hi button of the HiLink router is triggered. Certainly, the content of the probe request in which the IE 1 is extended and that is obtained before the Hi button is triggered may alternatively be different from the content of the probe request that carries the extended IE 1 and that is obtained after the Hi button of the HiLink router is triggered. For example, the probe request in which the IE 1 is extended and that is obtained before the Hi button is triggered may carry a device ID and a device type; and the probe request in which the IE 1 is extended and that is obtained after the Hi button is triggered may carry a device ID, a device type, and a device model. This is not limited in this embodiment of this application.

S55: The router (which may be the HiLink router) finds the probe request (the first probe request) that carries the customized extended information element IE 1 again, and feeds back, to the to-be-networked smart camera device, a probe response that carries an extended field 2 (Information Element 2, IE 2) as a first probe response for the probe request. The extended IE 2 includes a temporary SSID (as a first SSID) of a SOFT AP and a specified channel. The temporary SSID is used as an isolation network, is used for performing only communication between the HiLink router 30 and the to-be-networked smart camera device through the specified channel, and cannot be connected and accessed by using a public network. The temporary SSID is used for performing communication between the to-be-networked smart camera and the router through the specified channel.

The isolation network refers to that a local area network of the temporary SSID is used for only network distribution between the HiLink router and the to-be-networked smart camera device. After finding the to-be-networked smart camera, the HiLink router performs subsequent network distribution. For a field format of the extended IE 2, refer to the descriptions in the foregoing embodiment.

S56: The to-be-networked smart camera device receives the probe response (the second probe response) that carries the extended IE 2, and the to-be-networked smart camera device switches from the AP mode to a STA mode, and is connected to the temporary SSID and the specified channel that are allocated by the HiLink router.

S57: The to-be-networked smart camera device is connected to the temporary SSID and the specified channel, and obtains an IP address of the temporary SSID. The IP address is used by the smart camera device to access the router. The to-be-networked smart camera performs IP layer security negotiation of the following step S58 with the router based on the IP address.

S58: The router (which may be the HiLink router) performs IP layer security negotiation with the to-be-networked smart camera device. Then, the HiLink router transmits an SSID and a password of a master access point to the to-be-networked smart camera device by using the temporary SSID in an encrypted manner.

S59: The to-be-networked smart camera device receives and decrypts the SSID (as a second SSID) and the password of the master access point. The to-be-networked smart camera device is connected to the master AP of the HiLink router by using the decrypted SSID and the decrypted password of the master access point, to complete network distribution.

S60: The router disables the temporary SSID.

It should be noted that the step S55 to the step S60 may alternatively be directly performed after the step S50, the step S51, and the step S52. Alternatively, the step S58 to the step S60 are directly performed after the step S50, the step S51, and the step S52. This is not limited in this embodiment of this application.

In some embodiments of this application, the IP layer security negotiation performed between the HiLink router and the to-be-networked smart camera device in S58 in FIG. 5 is that the SSID and the password of the master access point are encrypted. After the to-be-networked smart camera device accesses, in the manner of S50 to S57, the temporary SSID allocated by the HiLink router, the SSID and the password of the master access point need to be encrypted. For the IP layer security negotiation and a manner of encrypting the SSID and the password, in this embodiment of this application, a personal identification number (Personal Identification Number, PIN) and a simple password-based exponential key exchange (SPEKE) protocol may be used for encryption. After receiving the encrypted SSID and the encrypted password, the to-be-networked smart camera device decrypts the encrypted SSID and the encrypted password in the PIN+SPEKE manner. In addition, a manner of encrypting and decrypting the SSID and the password may alternatively be that an advanced encryption standard (Advanced Encryption Standard, AES) 128 encryption algorithm is used to encrypt the SSID and the password, and then the encrypted SSID and the encrypted password are decrypted based on the AES128. In addition, the manner of encrypting and decrypting the SSID and the password may alternatively be another type. This is not limited in this embodiment of this application.

In the technical solution in this embodiment of this application, after the to-be-networked smart camera device enters the AP mode, the probe request that carries the extended IE 1 can be continuously automatically broadcast on the full-channel basis. After finding the probe request that carries the extended IE 1, the router feeds back, to the to-be-networked smart camera device, the probe response that carries the extended IE 2. The to-be-networked smart camera device switches to the STA mode and accesses the temporary network by using the temporary SSID and the password that are allocated by the HiLink router and that are carried in the extended IE 2. After the smart camera accesses the temporary network, the HiLink router transmits the SSID and the password of the master access point of the HiLink router to the smart camera by using the temporary network. The smart camera is disconnected from the temporary network, and accesses the network of the master access point of the HiLink router by using the SSID and the password of the master access point, to complete network distribution. In one aspect, the user needs to trigger only the Hi button to start the network distribution procedure, to implement network distribution between the HiLink router and the smart camera without operating an application in a mobile phone. Therefore, an operation is simple, network switching is not required, and accessibility is good. In another aspect, in this embodiment of this application, the HiLink router in this application feeds back the SSID and the password of the master access point to the smart camera by using the temporary network established based on the temporary SSID carried in the probe response that carries the extended IE 2. That is, when the HiLink router transmits the SSID and the password of the master access point to the to-be-networked smart camera, network distribution between the HiLink router and the smart camera is implemented through the specified channel provided by the temporary network. This does not affect network security between the smart camera and the master access point of the router. Therefore, security is higher.

The invention claimed is:

1. A network distribution method, applied to a first electronic device, the method comprising:
sending a second probe request that carries second device information of the first electronic device and an identifier indicating that the probe request is a network distribution request for performing soft-access point (SOFT AP) network distribution;
receiving a second probe response fed back by a second electronic device for the second probe request, wherein the second probe response is used to notify the first electronic device that the second electronic device receives the first probe request and allows the first electronic device to perform network distribution with the second electronic device;
after receiving the second probe response, sending a first probe request that carries first device information of the first electronic device;
in response to the first probe request, receiving a first probe response sent by the second electronic device, wherein the first probe response carries temporary networking data;
establishing a first connection to the second electronic device by using the temporary networking data;
receiving network distribution data of a master access point of the second electronic device from the second electronic device;
accessing the master access point of the second electronic device by using the network distribution data of the master access point; and
establishing a second connection to the second electronic device;
wherein the second probe request and the first probe request are sent by the first electronic device in an access point (AP) mode; and the method further comprises: in response to the first probe response, switching from the AP mode to station (STA) mode.

2. The network distribution method according to claim 1, wherein
the first device information of the first electronic device is carried in an extended field of the first probe request; and
the temporary networking data is carried in an extended field of the first probe response.

3. The network distribution method according to claim 2, wherein the temporary networking data comprises a first Service Set Identifier (SSID) and a specified channel that are temporarily allocated by the second electronic device, and the first SSID is used for communication between the first electronic device and the second electronic device through the specified channel.

4. The network distribution method according to claim 3, wherein the receiving network distribution data of the master access point of the second electronic device from the second electronic device comprises:
receiving the network distribution data of the master access point of the second electronic device from the second electronic device through the specified channel indicated in the temporary networking data.

5. The network distribution method according to claim 2, wherein the network distribution data of the master access point comprises an encrypted second Service Set Identifier (SSID) of the master access point of the second electronic device and an encrypted password for accessing the second SSID.

6. The network distribution method according to claim 1, wherein before receiving the network distribution data of the master access point of the second electronic device from the second electronic device, the network distribution method further comprises:
performing internet protocol (IP) layer negotiation with the second electronic device, so that the second electronic device generates, in an encrypted manner, the second SSID of the master access point of the second electronic device and the password for accessing the second SSID.

7. A first electronic device, comprising:
a processor; and
a non-transitory memory coupled to the processor and configured to store a computer program comprising instruction that, when executed by the processor, cause the first electronic device to perform the following steps:
sending a second probe request that carries second device information of the first electronic device and an identifier indicating that the probe request is a network distribution request for performing soft-access point (SOFT AP) network distribution;
receiving a second probe response fed back by a second electronic device for the second probe request, wherein the second probe response is used to notify the first electronic device that the second electronic device receives the first probe request and allows the first electronic device to perform network distribution with the second electronic device;
after receiving the second probe response, sending a first probe request that carries first device information of the first electronic device, wherein the second probe request and the first probe request are sent by the first electronic device in an access point (AP) mode;
receiving a first probe response sent by the second electronic device in response to the first probe request, wherein the first probe response carries temporary networking data;
in response to the first probe response, switching from the AP mode to station (STA) mode;
establishing a first connection to the second electronic device by using the temporary networking data;
receiving network distribution data of a master access point of the second electronic device from the second electronic device;
accessing the master access point of the second electronic device by using the network distribution data of the master access point; and
establishing a second connection to the second electronic device.

8. The device according to claim 7, wherein
the first device information of the first electronic device is carried in an extended field of the first probe request; and
the temporary networking data is carried an extended field of the first probe response.

9. The device according to claim 8, wherein the temporary networking data comprises a first Service Set Identifier (SSID) and a specified channel that are temporarily allocated by the second electronic device, and the first SSID is used for communication between the first electronic device and the second electronic device through the specified channel.

10. The device according to claim 7, wherein
the network distribution data of the master access point of the second electronic device from the second electronic device is received through the specified channel in the temporary networking data.

11. The device according to claim 8, wherein the network distribution data of the master access point comprises an encrypted second Service Set Identifier (SSID) of the master access point of the second electronic device and an encrypted password for accessing the second SSID.

12. The method according to claim 1, wherein the identifier is included in a vendor specific type field of an extended information element in the second probe request.

13. A non-transitory computer-readable medium storing code for network distribution, the code comprising instructions executable to:
send a second probe request that carries second device information of the first electronic device and an identifier indicating that the probe request is a network distribution request for performing soft-access point (SOFT AP) network distribution;
receive a second probe response fed back by a second electronic device for the second probe request, wherein the second probe response is used to notify the first electronic device that the second electronic device receives the first probe request and allows the first electronic device to perform network distribution with the second electronic device;
after receiving the second probe response, send a first probe request that carries first device information of the first electronic device, wherein the second probe request and the first probe request are sent by the first electronic device in an access point (AP) mode;
receive a first probe response sent by the second electronic device in response to the first probe request, wherein the first probe response carries temporary networking data;
in response to the first probe response, switch from the AP mode to station (STA) mode;
establish a first connection to the second electronic device by using the temporary networking data;
receive network distribution data of a master access point of the second electronic device from the second electronic device;
access the master access point of the second electronic device by using the network distribution data of the master access point; and
establish a second connection to the second electronic device.

14. Non-transitory computer-readable medium according to claim 13, wherein the temporary networking data comprises a first Service Set Identifier (SSID) and a specified channel that are temporarily allocated by the second electronic device, and the first SSID is used for communication between the first electronic device and the second electronic device through the specified channel.

15. The non-transitory computer-readable medium according to claim 14, wherein the network distribution data of the master access point of the second electronic device is received from the second electronic device through the specified channel indicated in the temporary networking data.

16. The non-transitory computer-readable medium according to claim 13, wherein the network distribution data of the master access point comprises an encrypted second Service Set Identifier (SSID) of the master access point of the second electronic device and an encrypted password for accessing the second SSID.

17. The non-transitory computer-readable medium according to claim 13, wherein before receiving the network distribution data of the master access point of the second electronic device from the second electronic device, the code further comprising instructions executable to:

perform internet protocol (IP) layer negotiation with the second electronic device, so that the second electronic device generates, in an encrypted manner, the second SSID of the master access point of the second electronic device and the password for accessing the second SSID.

* * * * *